United States Patent
Cho et al.

(10) Patent No.: US 12,419,453 B2
(45) Date of Patent: Sep. 23, 2025

(54) CONTROL METHOD OF COOKING APPARATUS

(71) Applicant: SAMSUNG ELECTRONICS CO., LTD., Suwon-si (KR)

(72) Inventors: Jin-Hee Cho, Suwon-si (KR); Dong Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 973 days.

(21) Appl. No.: 17/469,414

(22) Filed: Sep. 8, 2021

(65) Prior Publication Data

US 2021/0401216 A1 Dec. 30, 2021

Related U.S. Application Data

(63) Continuation of application No. 15/983,474, filed on May 18, 2018, now Pat. No. 11,141,017.

(30) Foreign Application Priority Data

May 19, 2017 (KR) .................... 10-2017-0062354

(51) Int. Cl.
*F24C 15/32* (2006.01)
*A23L 5/10* (2016.01)
(Continued)

(52) U.S. Cl.
CPC ............... *A47J 27/04* (2013.01); *A23L 5/13* (2016.08); *A47J 36/00* (2013.01); *F24C 15/327* (2013.01);
(Continued)

(58) Field of Classification Search
CPC ........................................ F22B 37/52
See application file for complete search history.

(56) References Cited

U.S. PATENT DOCUMENTS 4,186,419 A * 1/1980 Sims ............... H01H 36/02
335/206
4,287,407 A * 9/1981 Treiber ............... F22B 1/284
122/382

(Continued)

FOREIGN PATENT DOCUMENTS

CN 1926386 3/2007
DE 102009055146 A1 * 6/2011 ............. A47J 27/04
(Continued)

OTHER PUBLICATIONS

Chinese Office Action dated Apr. 24, 2022 from Chinese Application No. 201880047897.X.
(Continued)

*Primary Examiner* — Jorge A Pereiro
(74) *Attorney, Agent, or Firm* — STAAS & HALSEY LLP

(57) ABSTRACT

A control method of a cooking apparatus. The control method of the cooking apparatus includes controlling an operation of the water supply pump to supply water to the steam generator, controlling an operation of the water supply pump for a period of time to additionally supply water to the steam generator when a level of water supplied to the steam generator reaches a position. The method includes controlling an operation of a drain pump to discharge the water from the steam generator when the period of time expires, and respectively controlling an operation of a steam heater installed in the steam generator and a bottom heater installed on a bottom surface of the cooking apparatus, when the level of the water in the steam generator reaches the position at which the water is discharged from the steam generator.

8 Claims, 16 Drawing Sheets

(51) Int. Cl.
  *A47J 27/04* (2006.01)
  *A47J 36/00* (2006.01)
(52) U.S. Cl.
  CPC ..... *A23V 2002/00* (2013.01); *A47J 2027/043* (2013.01); *A47J 2203/00* (2013.01)

(56) References Cited

U.S. PATENT DOCUMENTS

| | | | | | |
|---|---|---|---|---|---|
| 4,409,999 | A | * | 10/1983 | Pedziwiatr | B08B 3/12 134/184 |
| 5,223,696 | A | * | 6/1993 | Violi | F22B 37/50 392/394 |
| 5,549,038 | A | * | 8/1996 | Kolvites | A47J 27/16 126/369 |
| 5,552,578 | A | * | 9/1996 | Violi | A47J 27/16 126/369 |
| 5,810,037 | A | * | 9/1998 | Sasaki | B08B 3/12 96/174 |
| 6,078,729 | A | * | 6/2000 | Kopel | F22B 1/284 392/327 |
| 6,227,215 | B1 | * | 5/2001 | Akazawa | B08B 9/0323 134/169 C |
| 6,833,032 | B1 | * | 12/2004 | Douglas | A21B 3/04 134/28 |
| 6,873,876 | B1 | * | 3/2005 | Aisa | G05B 19/042 219/745 |
| 7,348,520 | B2 | * | 3/2008 | Wang | F24C 15/327 219/400 |
| 7,856,875 | B2 | | 12/2010 | Jeon et al. | |
| 10,478,005 | B2 | * | 11/2019 | Utsumi | A21B 3/04 |
| 2003/0079735 | A1 | * | 5/2003 | Hines, Jr. | A21B 1/08 126/21 R |
| 2006/0011071 | A1 | * | 1/2006 | Cho | F24C 15/327 99/417 |
| 2006/0249136 | A1 | * | 11/2006 | Reay | F24C 15/327 126/20 |
| 2006/0249137 | A1 | * | 11/2006 | Reay | A47J 36/38 122/369 |
| 2007/0114222 | A1 | * | 5/2007 | Shon | A21B 3/04 219/401 |
| 2007/0157949 | A1 | * | 7/2007 | Ohler | B08B 9/08 134/169 R |
| 2007/0183555 | A1 | | 8/2007 | Kaneko et al. | |
| 2008/0006261 | A1 | * | 1/2008 | Saksena | F22B 13/02 126/369 |
| 2008/0163757 | A1 | * | 7/2008 | Jeon | A21B 3/04 99/330 |
| 2008/0163758 | A1 | * | 7/2008 | Jeong | G01F 23/265 122/494 |
| 2008/0317447 | A1 | * | 12/2008 | Lentz | F22B 1/284 392/326 |
| 2009/0056762 | A1 | * | 3/2009 | Pinkowski | D06F 39/40 134/22.15 |
| 2009/0107477 | A1 | * | 4/2009 | Frock | A21B 3/04 126/20.2 |
| 2009/0250452 | A1 | * | 10/2009 | Tse | F24C 15/327 219/400 |
| 2010/0126356 | A1 | * | 5/2010 | Yamamoto | F22B 1/285 99/330 |
| 2012/0167926 | A1 | * | 7/2012 | Nakamura | A61B 90/70 134/100.1 |
| 2012/0273477 | A1 | * | 11/2012 | Park | F24C 15/327 99/403 |
| 2014/0060339 | A1 | * | 3/2014 | Jeon | F22B 1/285 392/405 |
| 2014/0175085 | A1 | * | 6/2014 | Yang | F24C 15/327 219/401 |
| 2015/0030728 | A1 | * | 1/2015 | Raghavan | A47J 27/04 99/330 |
| 2016/0061458 | A1 | * | 3/2016 | van der Linden | F24C 15/327 219/401 |
| 2016/0061490 | A1 | * | 3/2016 | Cho | F24H 1/122 219/400 |
| 2016/0150906 | A1 | * | 6/2016 | Lee | F24C 15/003 392/401 |
| 2016/0360577 | A1 | * | 12/2016 | Mineoka | F24C 15/327 |
| 2017/0038079 | A1 | | 2/2017 | Stephens | |
| 2017/0079470 | A1 | * | 3/2017 | Lego | F24C 15/327 |
| 2017/0276378 | A1 | * | 9/2017 | Faraldi | F24C 15/327 |
| 2019/0203944 | A1 | * | 7/2019 | Cho | F24C 15/003 |

FOREIGN PATENT DOCUMENTS

| | | | |
|---|---|---|---|
| DE | 102014210669 | 12/2015 | |
| EP | 1430823 A1 * | 6/2004 | ............. A21B 3/04 |
| EP | 2375169 | 10/2011 | |
| EP | 2703740 | 3/2014 | |
| EP | 3553394 | 10/2019 | |
| FR | 2958725 | 10/2011 | |
| KR | 10-0802019 | 2/2008 | |
| KR | 10-2009-0057526 | 6/2009 | |
| KR | 10-2011-0058144 | 6/2011 | |
| KR | 10-2011-0082797 | 7/2011 | |
| KR | 10-1059818 | 8/2011 | |

OTHER PUBLICATIONS

Office Action dated Mar. 26, 2024 for corresponding European application No. 22 173 517.8.
Korean Office Action dated Apr. 21, 2021 from Korean Application No. 10-2017-0062354.
Chinese Office Action dated Apr. 30, 2021 from Chinese Application No. 201880047897.X.
Extended European Search Report dated Jul. 3, 2020 in European Patent Application No. 18802940.9.
European Communication dated Mar. 19, 2020 in European Patent Application No. 18802940.9.
International Search Report dated Sep. 28, 2018 in International Patent Application No. PCT/KR2018/005728.
U.S. Office Action dated Feb. 10, 2020 from U.S. Appl. No. 15/983,474.
U.S. Office Action dated Mar. 19, 2020 from U.S. Appl. No. 15/983,474.
U.S. Office Action dated Aug. 26, 2020 from U.S. Appl. No. 15/983,474.
U.S. Advisory Action dated Nov. 3, 2020 from U.S. Appl. No. 15/983,474.
U.S. Office Action dated Dec. 16, 2020 from U.S. Appl. No. 15/983,474.
U.S. Notice of Allowance dated Jun. 9, 2021 from U.S. Appl. No. 15/983,474.
U.S. Supplemental Notice of Allowability dated Aug. 4, 2021 from U.S. Appl. No. 15/983,474.
U.S. Appl. No. 15/983,474, filed May 18, 2018, Jin-Hee Cho, Samsung Electronics Co., Ltd.
Extended European Search Report dated Jul. 29, 2022 for European Application No. 22173517.8.
Korean Notice of Allowance dated Oct. 26, 2021 from Korean Patent Application No. 10-2017-0062354.
Chinese Office Action dated Oct. 9, 2022 in Chinese Patent Application No. 201880047897.X (3 pages; 4 pages English translation).
Office Action dated Mar. 27, 2023 in Korean Patent Application No. 10-2022-0086841.
European Office Action dated Jun. 30, 2025 for European Application No. 22173517.8.

* cited by examiner

CONTROL METHOD OF COOKING APPARATUS

CROSS-REFERENCE TO RELATED APPLICATION(S)

This application a continuation application of U.S. application Ser. No. 15/983,474, filed on May 18, 2018, in the United States Patent and Trademark Office, which is based on and claims priority under 35 U.S.C. § 119 to Korean Patent Application No. 10-2017-0062354, filed on May 19, 2017, in the Korean Intellectual Property Office, the disclosures of each of which are incorporated by reference herein in their entirety.

BACKGROUND

1. Field

Embodiments of the present disclosure relate to a control method of a cooking apparatus configured to control a steam generation amount.

2. Description of Related Art

In recent, cooking apparatuses configured to cook food using the heat of steam have been used.

The cooking apparatus includes a steam supplier for supplying steam to a cooking compartment in which food is cooked.

The steam supplier includes a water storage unit for storing water, and a steam generator for generating steam by heating the water delivered from the water storage unit. The steam supplier allows foods in the cooking compartment to be cooked by supplying the steam, which is generated by the steam generator, to the cooking compartment.

SUMMARY

Therefore, it is an aspect of the present disclosure to provide a control method of a cooking apparatus capable of increasing a steam generation amount per unit by supplying water to a bottom surface of a cooking compartment and heating the water in the bottom surface using a heater.

It is another aspect of the present disclosure to provide a control method of a cooking apparatus capable of preventing water leakage in a water supply pump by controlling an operation of a drain pump for a short period of time after stopping an operation of the water supply pump.

Additional aspects of the present disclosure will be set forth in part in the description which follows and, in part, will be obvious from the description, or may be learned by practice of the present disclosure.

In accordance with an aspect of the disclosure, a control method of a cooking apparatus provided with a storage container configured to store water, a steam generator installed below a lower side of the storage container to receive water from the storage container, a water supply pump installed above an upper side of the storage container to supply the water from the storage container to the steam generator, and a drain pump installed above the upper side of the storage container to discharge the water from the steam generator to the storage container. The control method includes controlling an operation of the water supply pump to supply the water from the storage container to the steam generator; and controlling an operation of the drain pump to discharge water in the steam generator when a level of water supplied to the steam generator reaches a position.

The cooking apparatus may further include a water level sensor configured to collect water level information related to the water in the steam generator, and the control method may further include collecting, by the water level sensor, water level information related to the water supplied to the steam generator.

The controlling of the operation of the drain pump may include controlling the drain pump for a period of time to discharge the water present in the steam generator.

The control method may further include controlling the water supply pump to additionally supply water to the steam generator when the level of the water supplied to the steam generator reaches the position.

The controlling of the operation of the water supply pump to additionally supply water to the steam generator may include controlling the water supply pump for a period of time.

The control method may further include controlling the operation of the drain pump to discharge the water in the steam generator when the period of time expires.

The controlling of the operation of the drain pump to discharge the water in the steam generator may include controlling the drain pump to allow the level of water supplied to the steam generator to reach the position again.

The position of the level of the water is a first position and the controlling of the operation of the drain pump to discharge the water in the steam generator may include controlling the operation of the drain pump to allow the level of water supplied to the steam generator to reach a second position.

In accordance with another aspect of the disclosure, a control method of a cooking apparatus includes controlling an operation of a water supply pump to supply water to a steam generator; controlling the operation of the water supply pump for a period of time to supply water to the steam generator subsequent to a level of water supplied to the steam generator reaches a third predetermined position; controlling an operation of a drain pump to discharge water from the steam generator when the period of time expires; and controlling an operation of a steam heater installed in the steam generator and a bottom heater installed on a bottom surface of the cooking apparatus, respectively, when the level of water in the steam generator reaches the position at which the water is discharged from the steam generator.

The period of time to supply water to the steam generator is a first period of time, and controlling of the operation of the steam heater and the bottom heater may include controlling the steam heater and the bottom heater for a second period of time.

The control method may further include controlling the operation of the drain pump to discharge the water from the steam generator when the second period of time is expired.

The control method may further include collecting, by a water level sensor, water level information related to water supplied to the steam generator.

The control method may further include supplying water, which is supplied to the steam generator, into an inside of a cooking compartment of the cooking apparatus.

In accordance with another aspect of the disclosure, a control method of a cooking apparatus provided with a storage container configured to store water, a steam generator installed below a lower side of the storage container to receive the water from the storage container, a water supply pump installed above an upper side of the storage container to supply the water from the storage container to the steam generator, and a drain pump installed above the upper side of the storage container to discharge the water from the steam generator to the storage container. The control method includes controlling an operation of the water supply pump to supply water from the storage container to the steam generator; controlling an operation of the drain pump to discharge water in the steam generator when a level of water supplied to the steam generator reaches a position; controlling the operation of the water supply pump for a period of time to supply water to the steam generator subsequent to a level of water supplied to the steam generator reaching another position; controlling the operation of the drain pump to discharge the water from the steam generator when the third period of time expires; and controlling an operation of a steam heater installed in the steam generator and a bottom heater installed on a bottom surface of the cooking apparatus, respectively, when the level of the water in the steam generator reaches the position at which the water is discharged from the steam generator.

The cooking apparatus may further include a water level sensor configured to collect water level information related to water in the steam generator, and the control method may further include collecting, by the water level sensor, water level information related to water supplied to the steam generator.

The period of time for controlling the operation of the water supply pump is a first period of time and controlling of the operation of the drain pump may include controlling the drain pump for a second period of time to discharge the water in the steam generator.

The control method may further include controlling the water supply pump for another period of time to additionally supply water to the steam generator when the level of water supplied to the steam generator reaches the first position; and controlling the operation of the drain pump to allow the level of water in the steam generator to reach the position again, when the other period of time is expired.

The position is a first position, and controlling of the operation of the drain pump to discharge water in the steam generator may include controlling the operation of the drain pump to allow the level of water supplied to the steam generator to reach another position.

The period of time of controlling the water supply pump is a first period of time, and controlling of the operation of the steam heater and the bottom heater may include controlling the steam heater and the bottom heater for a second period of time.

The control method may further include controlling the operation of the drain pump to discharge water from the steam generator when the second period of time expires.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Figure 1:
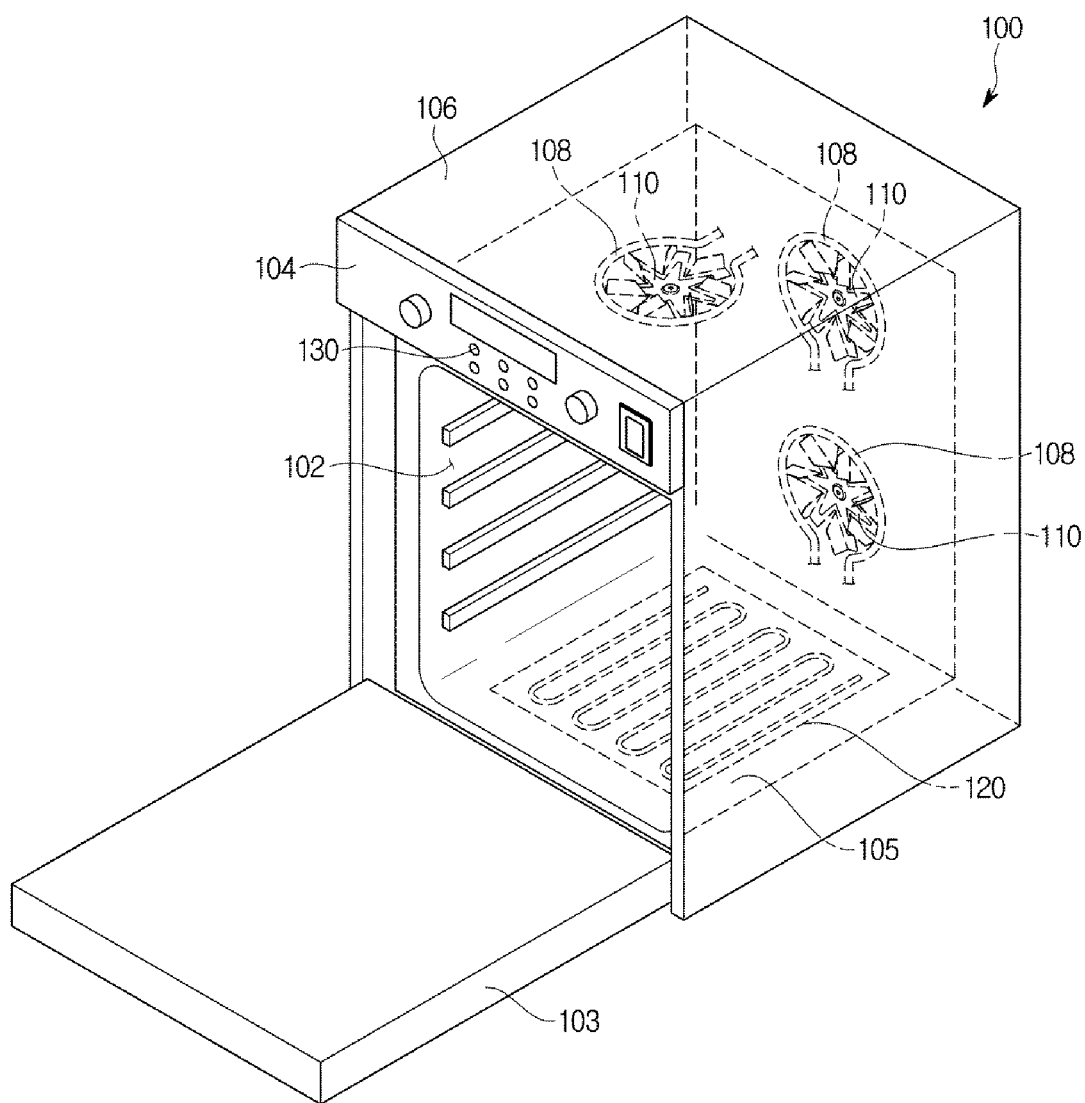
FIG. 1 is a perspective view of a cooking apparatus according to an embodiment.
Figure 2:
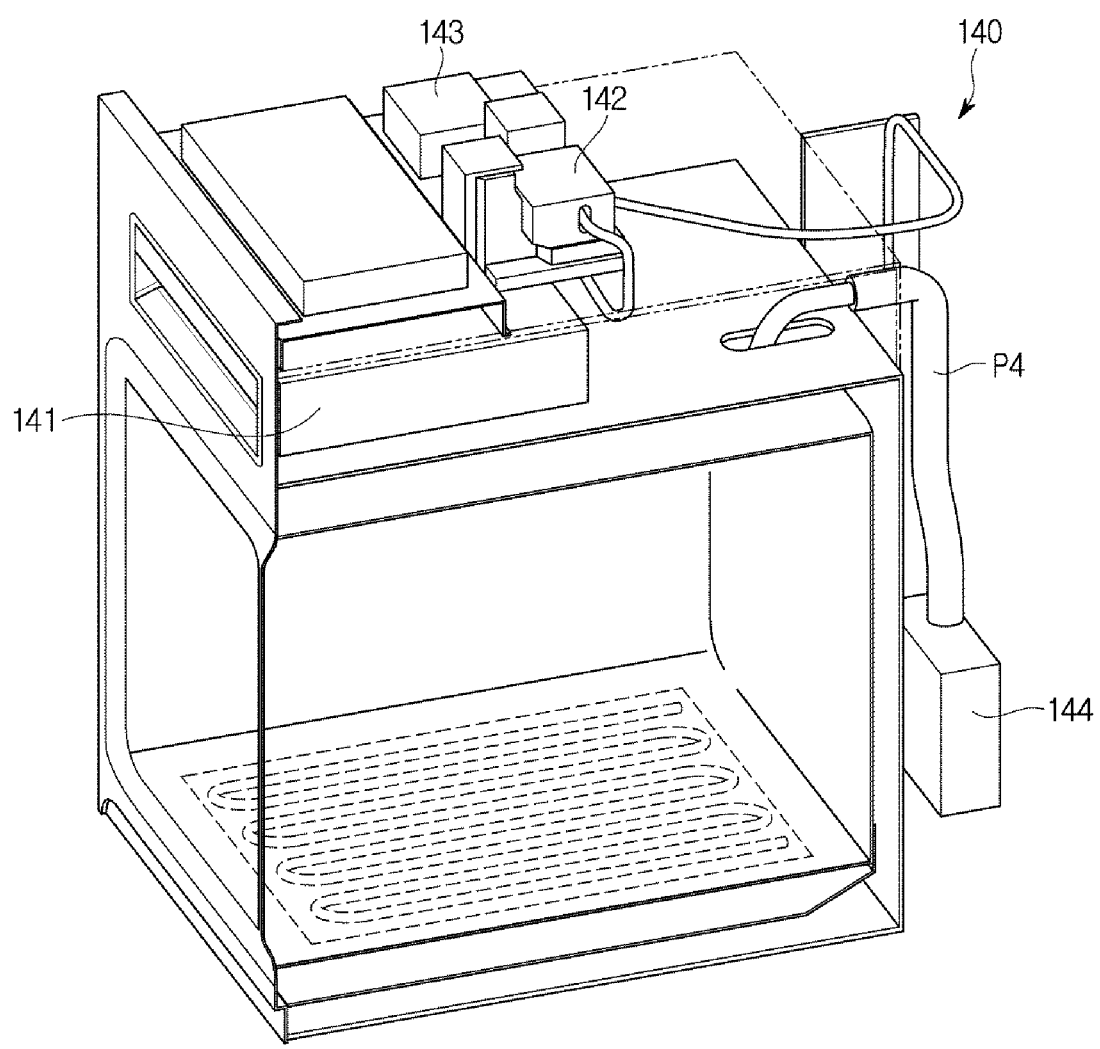
FIG. 2 is a cross-sectional view of the cooking apparatus according to an embodiment.
Figure 3:
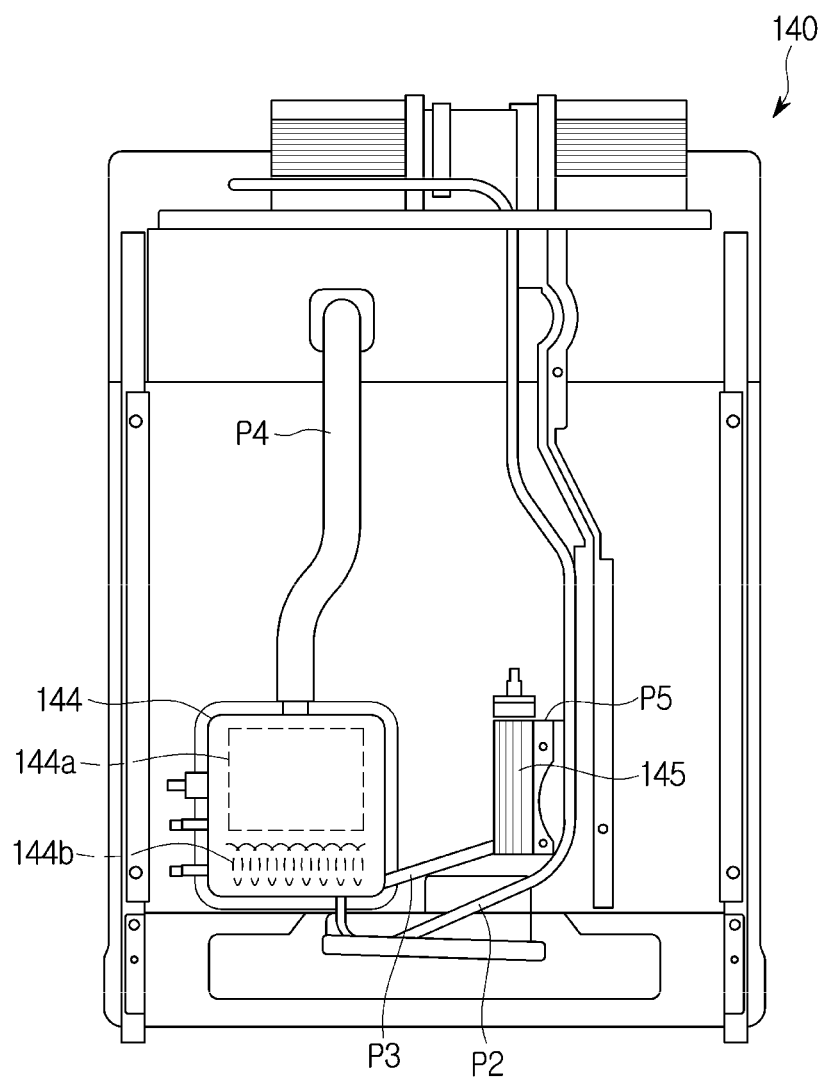
FIG. 3 is a view illustrating a case in which a steam supplier is applied to the rear side of the cooking apparatus according to an embodiment.
Figure 4:
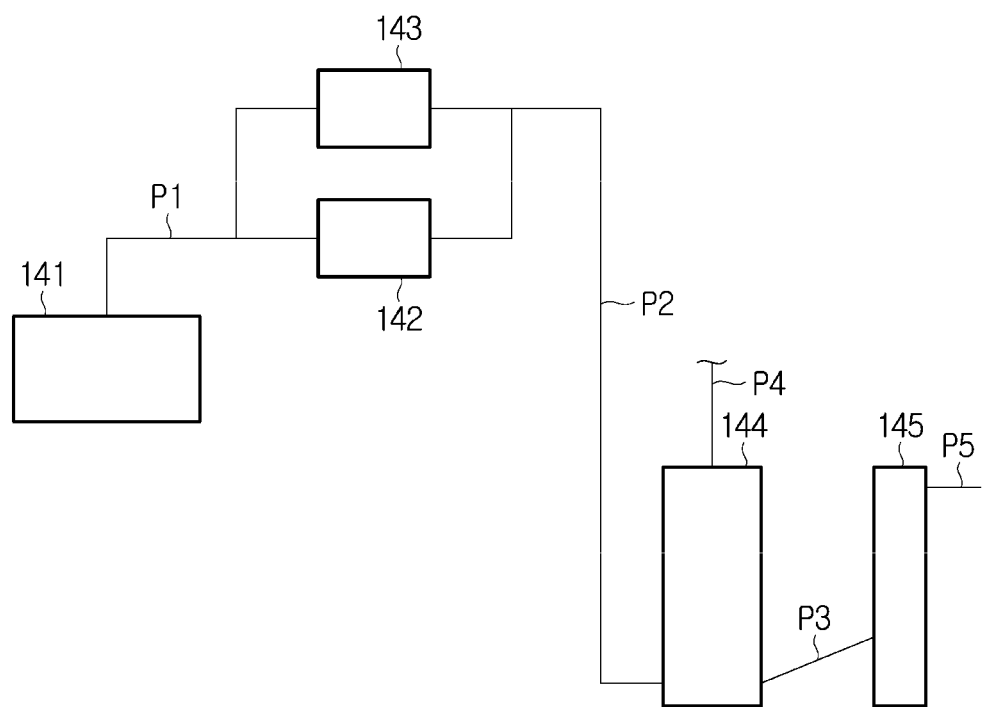
FIG. 4 is a schematic view of the steam supplier according to an embodiment.

FIG. 1 is a perspective view of a cooking apparatus 100 according to an embodiment, FIG. 2 is a cross-sectional view of the cooking apparatus 100 according to an embodiment, FIG. 3 is a view illustrating a case in which a steam supplier 140 is applied to the rear side of the cooking apparatus 100 according to an embodiment, and FIG. 4 is a schematic view of the steam supplier 140 according to an embodiment.

Referring to FIGS. 1 to 4, the cooking apparatus 100 includes a main body 104 configured to form an outer appearance and provided with a cooking compartment 102 therein, a cover 106 configured to cover an upper side, both lateral sides, and a rear side of the main body 104, a convection heater 108 and a convection fan 110 disposed on the upper side and the rear side to heat the cooking compartment 102, a steam supplier 140 configured to generate steam and supply the steam to the inside of the cooking compartment 102, and a bottom heater 120 configured to additionally supply steam by heating water supplied to a bottom surface 105 of the cooking compartment 102.

The front side of the main body 104 is opened to allow food to be put into or withdrawn from the cooking compartment 102, and the cooking compartment 102 in which the food is placed is opened or closed by a door 103 coupled to the front side of the main body 104. A control panel 130 provided with various operation switches for controlling the operation of the cooking apparatus 100 by a user is disposed on the upper portion of the front surface of the main body 104.

The convection heaters 108 disposed on the upper and rear sides of the main body 104 provide heat for heating the foods inside the cooking compartment 102. The convection fans 110 allow the heat, which is generated by the convection heater 108, to be convected inside the cooking compartment 102 or allow the steam, which is generated by the steam generator 144 other than the convection heater 108, to be evenly circulated inside the cooking compartment 102.

The steam supplier 140 may be provided in a space between the main body 104 and the cover 106. The steam supplier 140 includes a storage container 141, a water supply pump 142, a drain pump 143, a steam generator 144, and a water level sensor 145.

The storage container 141 configured to store water, which is to be supplied to the steam supplier 140, the water supply pump 142 configured to supply water, which is supplied from the storage container 141, to the steam generator 144, and the drain pump 143 configured to discharge water, which is remaining inside the steam generator 144, to the storage container 141 may be disposed in the space between the upper portion of the main body 104 and the cover 106. The water supply pump 142 and the drain pump 143 are provided at a position higher than the storage container 141 with respect to the bottom surface 105 of the cooking compartment 102. One end of the storage container 141 is connected to one end of the water supply pump 142 and the drain pump 143 by a first connection pipe P1. The other end of the water supply pump 142 and the drain pump 143 is connected to one end of the steam generator 144 by a second connection pipe P2.

The steam generator 144 heating water supplied from the storage container 141 to generate steam so as to supply the steam to the inside of the cooking compartment 102, and the water level sensor 145 being connected to the steam generator 144 so as to measure a level of water stored inside the steam generator 144 may be disposed in the space between the rear portion of the main body 104 and the cover 106.

The steam generator 144 and the water level sensor 145 are connected by a third connection pipe P3. The third connection pipe P3 connects the steam generator 144 to the water level sensor 145 so that the water flows into the steam generator 144 and at the same time the water flows into the water level sensor 145.

The steam generator 144 includes a steam container 144a generating steam and a steam heater 144b heating the water supplied to the steam container 144a. The steam generated in the steam generator 144 is supplied to the inside of the cooking compartment 102 through a steam supply pipe P4 connecting the steam generator 144 to the inside of the cooking compartment 102.

The water level sensor 145 is configured to measure the level of water stored inside the steam generator 144. It is an aspect of the present disclosure to provide a control method of a cooking apparatus capable of controlling the amount of steam generated inside the cooking compartment 102 and thus it is required to measure an amount of water supplied to the steam generator 144. Therefore, according to the disclosure, the water supplied to the steam generator 144 is simultaneously supplied to the water level sensor 145 through the third connection pipe P3 by connecting the steam generator 144 to the water level sensor 145. An air outflow pipe P5 is provided at an upper portion of the water level sensor 145 to adjust a pressure difference, which is generated in the water level sensor 145 by water flowing into and out of the water level sensor 145, and the air outflow pipe P5 is connected to the outside of the cooking apparatus 100.

The water level sensor 145 may be a float-less switch. The float-less switch may be configured to detect the water level by sensing the short such that a plurality of electrodes is installed in the water bath and the electrode is short according to the height of the liquid surface. The type of the water level sensor 145 is not limited thereto, but for convenience of description, the case of using the float-less-switch will be described as an example.

Figure 5:
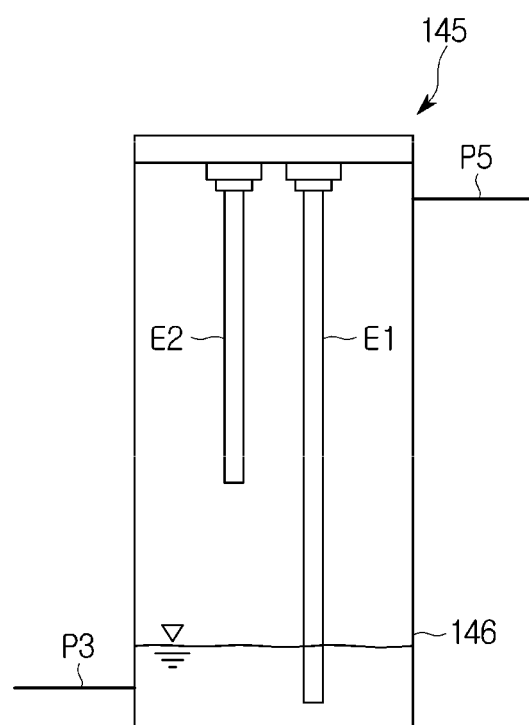
FIG. 5 is a diagram illustrating a structure of a float-less switch.

FIG. 5 is a diagram illustrating a structure of a float-less switch.

Referring to FIG. 5, the float-less switch includes a sensor housing 146 and a first electrode E1 and a second electrode E2 housed within the sensor housing 146. The first electrode E1 is longer than the second electrode E2 in the longitudinal direction of the sensor housing 146 and thus the first electrode E1 and the second electrode E2 are installed such that the first electrode E1 is always immersed in water and a predetermined voltage is supplied to the second electrode E2. When water is supplied into the sensor housing 146, the end of the second electrode E2 is immersed in water. When the end of the second electrode E2 is immersed in water, the current may flow through the water, and the float-less switch may detect the water level by sensing the current flow. According to the intention of the designer, the number of float-less switch electrodes may vary. As the number of float-less switch electrodes increases, the water level may be detected more precisely.

The bottom heater 120 configured to additionally generate steam by heating the water supplied into the cooking compartment 102 is disposed on the bottom surface 105 of the cooking compartment 102. According to the disclosure, it may be possible to additionally generate steam using the bottom heater 120 installed on the bottom surface 105 of the cooking compartment 102, so as to secure the cooking performance of the cooking apparatus 100 without increasing the output of the steam generator 144. Hereinafter, it will be described in detail in the related part.

Hereinbefore the structure of the cooking apparatus 100 has been described.

Hereinafter the operation of the cooking apparatus 100 according to the present disclosure will be described based on the above-described contents.

Figure 6:
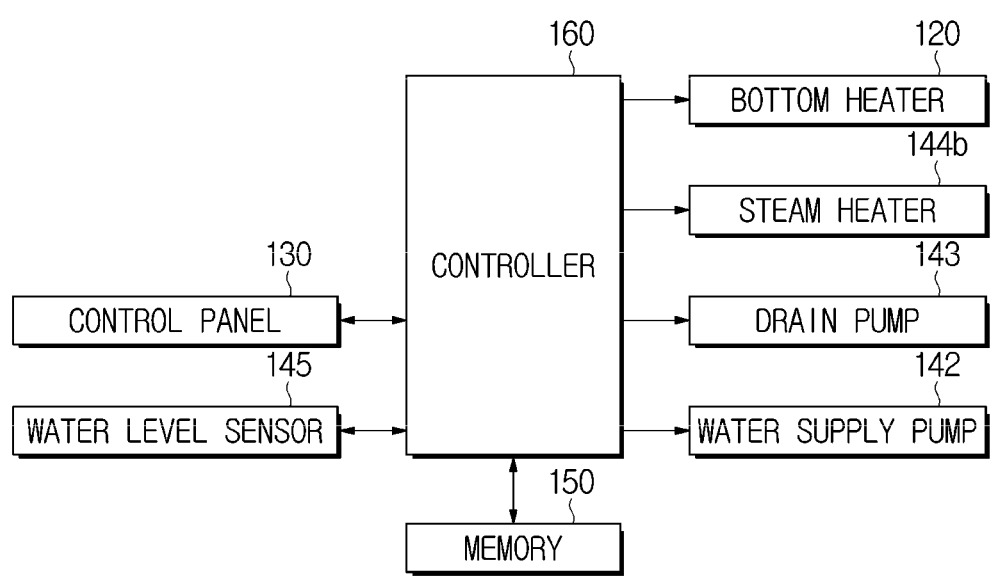
FIG. 6 is a view illustrating a control block diagram of the cooking apparatus according to an embodiment.

FIG. 6 is a view illustrating a control block diagram of the cooking apparatus 100 according to an embodiment.

Referring to FIG. 6, according to an embodiment, the cooking apparatus 100 includes the control panel 130, the water level sensor 145, the memory 150, the drain pump 143, the water supply pump 142, the steam heater 144b, the bottom heater 120, and the controller 160. Hereinafter the redundant description of the drain pump 143, the water supply pump 142, the steam heater 144b, and the bottom heater 120 will be omitted.

The control panel 130 receives an operation command of the cooking apparatus 100 from a user and displays operation information of the cooking apparatus 100 to the user. The control panel 130 includes an input configured to receive an operation command of a user, and a display configured to display the operation information of the cooking apparatus 100.

The input may receive an operation mode setting command for the cooking apparatus 100. According to the disclosure, it may be possible to set an operation mode of the cooking apparatus 100 so as to regulate the amount of steam supplied to the cooking compartment 102 in stages.

For example, the operation mode of the cooking apparatus 100 may be classified into a first cooking mode and a second cooking mode. Hereinafter, the first cooking mode is defined as a cooking mode by using steam generated by the steam generator 144, and the second cooking mode is defined as a cooking mode by using steam, which is generated in the bottom surface 105 of the cooking compartment 102 by additionally supplying water into the cooking compartment 102 and at the same time by using steam generated by the steam generator 144. According to embodiments, the second cooking mode may be classified into sub-modes based on the amount of steam, and hereinafter for convenience of description, a case in which an operation mode of the cooking apparatus 100 is classified into the first and second mode will be described as an example.

The display may display an operation mode of the cooking apparatus 100 and provide a visual image of the corresponding mode.

The input may employ a pressure switch or a touch pad and the display may employ a liquid crystal display (LED) panel or a light emitting diode (LED) panel.

The water level sensor 145 may detect the level of the water supplied to the steam generator 144 and transmit the detected water level information to the controller 160. A float-less switch may be used as the water level sensor 145.

The memory 150 may store various data, programs or applications for driving and controlling the cooking apparatus 100.

The memory 150 may store water level information, water supply amount and water supply time information, and drain time information, wherein the water is to be supplied to the steam generator 144 according to the operation mode of the cooking apparatus 100, and operation time information of the bottom heater 120. The memory 150 may store water level information, water supply amount and water supply time information, and drain time information, wherein the information is related to target steam amount to be supplied to the steam generator 144, and operation time information of the bottom heater 120. The memory 150 may store the water level information of the steam generator 144 detected by the water level sensor 145.

The memory 150 may be a concept including a ROM and a RAM of a controller 160, which will be described later. In addition, the memory 150 may be used as a term including a memory card (for example, micro SD card, USB memory, etc.) mounted on the cooking apparatus 100 according to embodiments. In addition, the memory 150 may include a nonvolatile memory, a volatile memory, a hard disk drive (HDD) or a solid state drive (SSD).

The controller 160 may include a processor, a ROM in which a control program is stored for controlling the control of the cooking apparatus 100, and a RAM in which a signal and data input from the outside of the cooking apparatus 100 are stored or the RAM, which is used as a storage area corresponding to various operation performed in the cooking apparatus 100.

The controller 160 may control the overall operation of the cooking apparatus 100 and the signal flow between the internal components of the cooking apparatus 100, and perform data processing. The controller 160 may execute a program or various applications stored in the memory 150 when the input of the user or a predetermined condition is satisfied.

According to the disclosure, the controller 160 may execute the water leakage prevention program of the water supply pump 142. The water leakage prevention program described later may be applied to a process of controlling the operation of the water supply pump 142 in the cooking mode of the cooking apparatus 100 according to the disclosure.

Hereinafter prior to describing the water leakage prevention control process of the water supply pump 142, the background thereof will be described.

When the water supply pump 142 is operated and then stopped in a state in which the water supply pump 142 is not completely sealed, water may be unintentionally supplied from the storage container 141 to the steam generator 144 due to the principle of siphon. Siphon means a device provided with an inverted 'U' shaped tube and configured to allow water in one place to flow to another place lower than the one place by passing through another place higher than the one place. Since water in the tube flows due to the pressure difference, water may flow over although there is a high place in the middle. When the high place in the middle exceeds hydraulic grade line, a pressure in the tube may become a negative. However, since the absolute pressure cannot be lower than 0 (zero), the water may not flow continuously when the tube is raised above the level corresponding to atmospheric pressure from the hydrodynamic inclined line.

When the water supply pump 142 is operated and then stopped, water may be unintentionally supplied from the storage container 141 to the steam generator 144 due to the principle of siphon. Therefore, according to the disclosure, it may be possible to operate the drain pump 143 at the last stage of the water supply process, so as to prevent the water leakage. Accordingly, it may be possible to prevent the water leakage although the pump motor of the water supply pump 142 fails.

Figure 7:
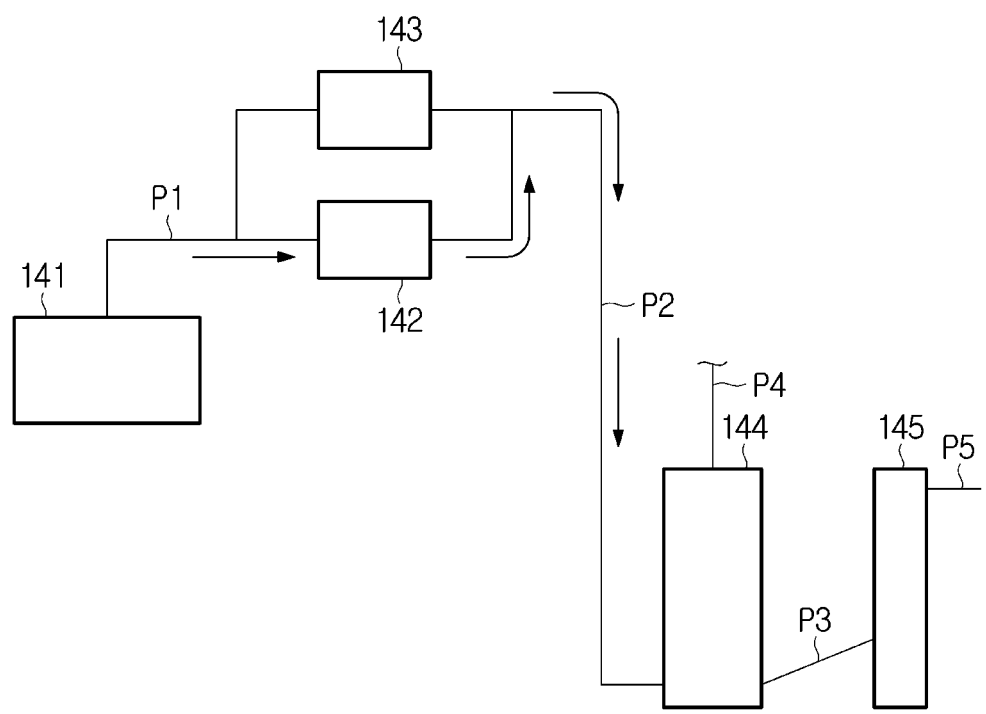
FIG. 7 is a view illustrating a water supply process of the cooking apparatus according to the disclosure.
Figure 8:
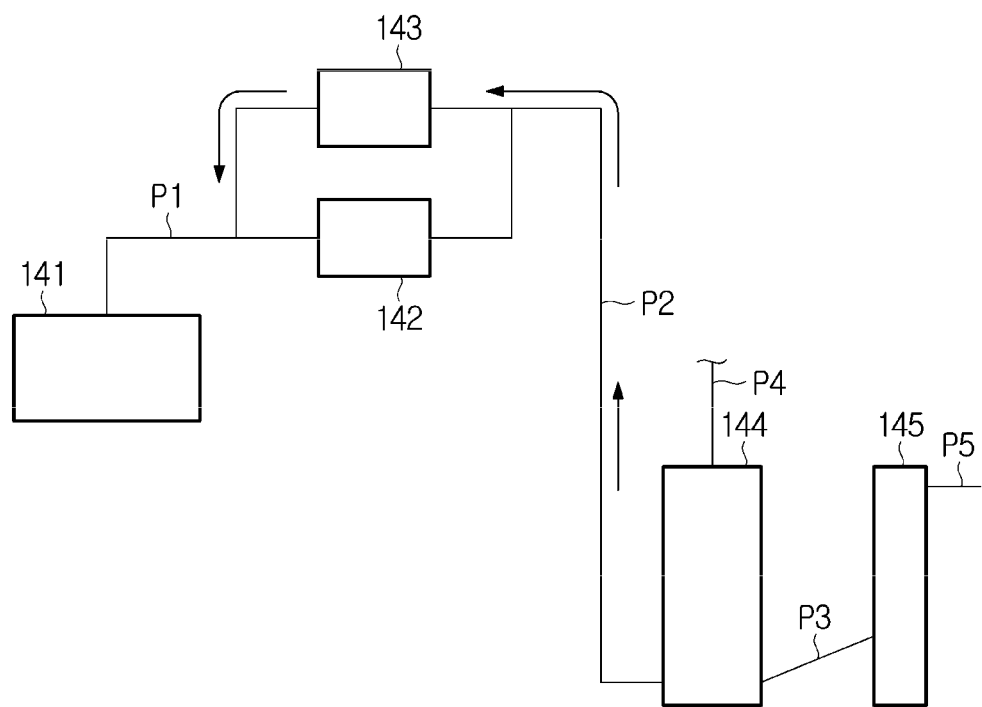
FIG. 8 is a view illustrating a water drainage process of the cooking apparatus according to the disclosure.

Hereinafter the control process of the controller 160 will be described with reference to the accompanying drawings. FIG. 7 is a view illustrating a water supply process of the cooking apparatus 100 according to the disclosure, and FIG. 8 is a view illustrating a water drainage process of the cooking apparatus 100 according to the disclosure.

The controller 160 may control the operation of the water supply pump 142 so as to supply water to the steam generator 144 from the storage container 141. As illustrated in FIG. 7, the water is supplied from the storage container 141 to the steam generator 144 as the water supply pump 142 operates. Until the level of water supplied to the steam generator 144 reaches a predetermined first position, the controller 160 may control the operation of the water supply pump 142 based on sensor value information transmitted from the water level sensor 145.

When the level of the water supplied to the steam generator 144 reaches the first predetermined position, the controller 160 may allow the operation of the water supply pump 142 to be stopped. The water may be unintentionally supplied from the storage container 141 to the steam generator 144 due to the above-described siphon principle. According to the disclosure, it may be possible to perform a control process of the operation of the drain pump 143 described below, so as to prevent the water leakage.

The controller 160 may control the operation of the drain pump 143 to discharge the water present in the steam generator 144. As illustrated in FIG. 8, the water is discharged from the steam generator 144 to the storage container 141 as the drain pump 143 operates.

The controller 160 may control the operation of the drain pump 143 for a first predetermined period of time, so as to discharge water present in the steam generator 144. The first period of time may be designed by the designer's intention and thus the first period of time may be designed as a proper period of time in a target range for changing a water flow into an opposite direction so as to prevent the water leakage in the water supply process.

According to another embodiment, the controller 160 may control the operation of the drain pump 143 for a predetermined period of time after the water supply process. According to embodiments, the controller 160 may control the operation of the drain pump 143 by receiving sensor value information related to the plurality of positions, from the water level sensor 145.

According to another aspect of the disclosure, the controller 160 may performs a program for increasing the steam generation amount so as to increase the steam generation amount according to the cooking mode of the cooking apparatus 100. The controller 160 may perform the control operation for increasing the steam generation amount according to the cooking mode of the cooking apparatus 100, and hereinafter the control process of the controller 160 will be described in detail.

The controller 160 may control the operation of the water supply pump 142 to supply water to the steam generator 144 when an operation command related to the first cooking mode is input from the user.

When the level of the water supplied to the steam container 144a of the steam generator 144 reaches a predetermined third position, the controller 160 may control the operation of the steam heater 144b installed in the steam generator 144 to generate steam. Hereinafter for convenience of description, supplying water to the steam container 144a of the steam generator 144 may be described as supplying water to the steam generator 144. The steam generated by the steam generator 144 is supplied to the inside of the cooking compartment 102 by passing through the steam supply pipe P4.

The controller 160 may identify whether the level of the water supplied to the steam generator 144 reaches the third position, based on the sensor value information received from the second electrode E2 of the water level sensor 145. When the level of the water present in the water level sensor 145 gradually increases and the level of the water reaches the third position, a sensor value of the second electrode E2 may be changed from $v_1$ V to 0 V. The controller 160 may identify a point of time, in which the sensor value of the second electrode E2 is changed from $v_1$ V to 0 V, as a point of time in which the level of water present in the steam generator 144 reaches the third position.

When it is identified that the level of water supplied to the steam generator 144 reaches the predetermined third position, the controller 160 may output an operation control command to the steam heater 144b.

Meanwhile, when an operation command related to the second cooking mode is input from the user, the controller 160 may control the operation of the water supply pump 142 to supply water to the steam generator 144.

When the level of water supplied to the steam generator 144 reaches the third predetermined position, the controller 160 may control the water supply pump 142 for the third predetermined period of time, so as to additionally supply water to the steam generator 144.

The third period of time corresponds to a value that is predetermined according to the specification of the cooking apparatus 100 by the designer, wherein the third period of time corresponds to a sufficient period of time to allow water, which flows over after being supplied to the inside of the steam generator 144, to be supplied to the inside of the cooking compartment 102 by passing through the steam supply pipe P4. The third period of time may vary according to the size of the steam container 144a installed inside the steam generator 144 and the capacity of the water supply pump 142.

The above mentioned operation is configured to supply water to the inside of the cooking compartment 102 through the steam supply pipe P4 connecting the steam generator 144 to the inside of the cooking compartment 102. The water supplied to the inside of the cooking compartment 102 may be collected on the bottom surface 105 of the cooking compartment 102 and thus when the bottom heater 120 installed on the bottom surface 105 of the cooking compartment 102 operates, steam generated in the bottom surface 105 of the cooking compartment 102 may be supplied to the cooking process.

When the third period of time is expired, the controller 160 may control the operation of the steam generator 144 to discharge water from the steam generator 144. When the drain pump 143 operates, the water is discharged from the steam generator 144, and the level of water gradually decreases.

Until the level of water present in the steam generator 144 reaches the third position, the controller 160 may control the operation of the drain pump 143. When the level of the water present in the water level sensor 145 gradually decreases and the level of the water reaches the third position, a sensor value of the second electrode E2 may be changed from 0 V to $v_1$ V. The controller 160 may identify a point of time, in which the sensor value of the second electrode E2 is changed from 0 V to $v_1$ V, as a point of time in which the level of water present in the steam generator 144 reaches the third position.

When the water is discharged from the steam generator 144 and the water level present in the steam generator 144 reaches the third position, the controller 160 may control the operation of the steam heater 144b installed on the steam generator 144 and the operation of the bottom heater 120 installed on the bottom surface 105 of the cooking compartment 102.

The controller 160 may control the operation of the steam heater 144b and the bottom heater 120 for a fourth predetermined period of time. The fourth predetermined period of time may be related to the third period of time corresponding to a period of time for additionally supplying water to the steam generator 144. That is, as the amount of water supplied to the bottom surface 105 of the cooking compartment 102 increases, the operation time of the heater may be set longer. The operation time of the steam heater 144b may be set to be identical to the operation time of the bottom heater 120, but is not limited thereto. Therefore, the operation time of the steam heater 144b may be set to be longer than the operation time of the bottom heater 120 or alternatively, the operation time of the bottom heater 120 may be set to be longer than the operation time of the steam heater 144b. The setting of the operation time may be related to the amount of water supplied to the bottom surface 105 of the cooking compartment 102.

When the fourth period of time is expired, the controller 160 may control the operation of the drain pump 143 to discharge water from the steam generator 144. When the discharging operation is completed, the controller 160 may terminate the cooking mode. The controller 160 may identify that the discharging operation is completed after controlling the operation of the drain pump 143 for a predetermined period of time. According to embodiments, the controller 160 may identify whether the discharging operation is completed based on the sensor value information collected by the water level sensor 145.

As described above, the cooking apparatus 100 according to the disclosure is configured to additionally supply steam to the inside of the cooking compartment 102 using the bottom heater 120 installed on the bottom surface 105 of the cooking apparatus 100, and thus without increasing the output of the steam generator 144, it may be possible to improve the steam cooking performance of the cooking apparatus 100 by increasing the total amount of steam. Hereinbefore the configuration and operation principle of the cooking apparatus 100 have been described. As for the cooking apparatus 100 according to the disclosure, the above mentioned control for increasing the amount of steam and the water leakage prevention control may be selectively applied, as needed or both of the control for increasing the amount of steam and the water leakage prevention control may be applied to the cooking apparatus 100 according to embodiments.

Next, the control process of the cooking apparatus 100 will be described based on the above-described description of the configuration and operation principle of the cooking apparatus 100.

Next, a control method of the cooking apparatus 100, to which the control process for preventing the water leakage of the water supply pump 142 installed in the steam supplier 140 is applied, will be described.

Figure 9:
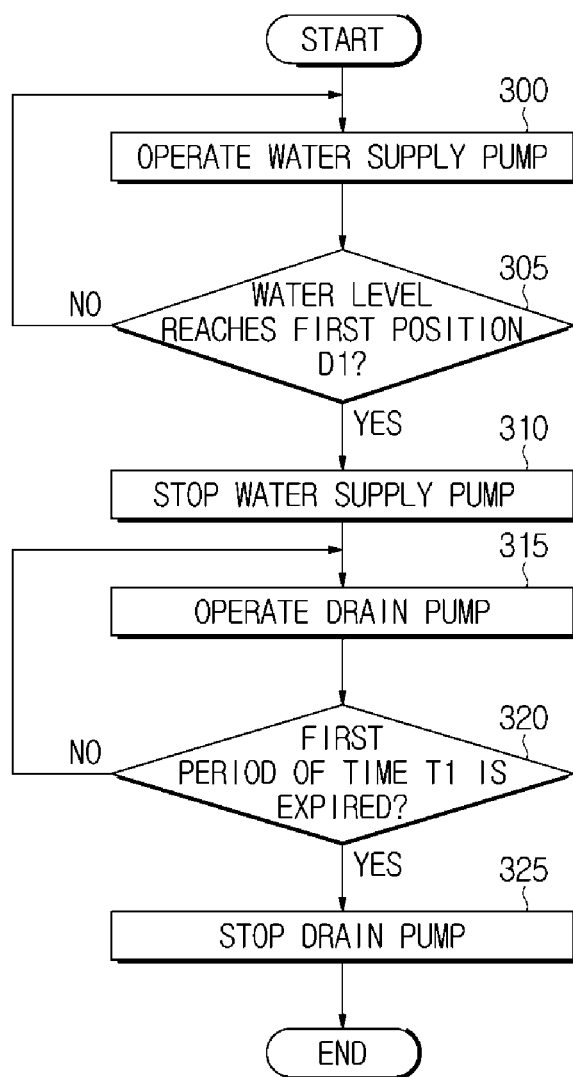
FIG. 9 is a view illustrating a control process of a cooking apparatus according to an embodiment.
Figure 10:
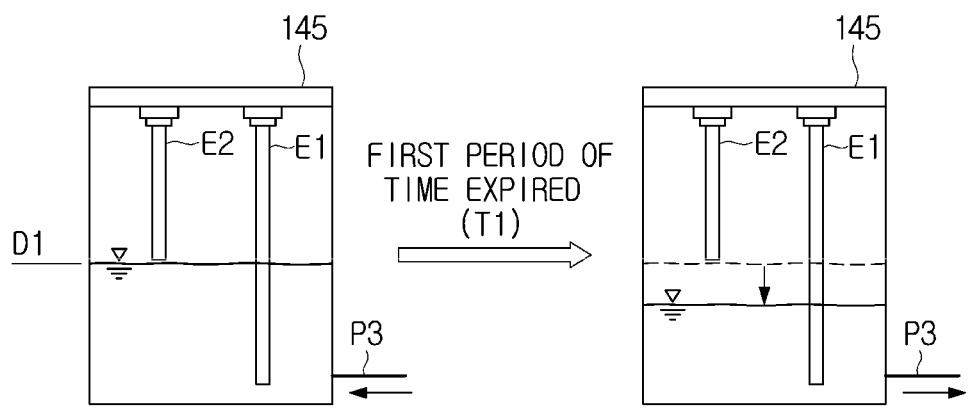
FIG. 10 is a view illustrating a change in the level of water supplied to the water level sensor according to the control process shown in FIG. 9.

FIG. 9 is a view illustrating a control process of a cooking apparatus 100 according to another embodiment, and FIG. 10 is a view illustrating a change in the level of water supplied to the water level sensor 145 according to the control process shown in FIG. 9. Since the water supplied to the steam container 144a of the steam generator 144 is supplied to the water level sensor 145 at the same level, a view illustrating a change in the level of the water supplied to the steam container 144a is omitted in FIG. 10.

Referring to FIGS. 9 and 10, a water supply process according to an embodiment is started by a process of controlling the operation of the water supply pump 142.

The controller 160 may control the operation of the water supply pump 142 to supply water from the storage container 141 to the steam generator 144. The water is supplied from the storage container 141 to the steam generator 144 as the water supply pump 142 operates (300).

Until the level of the water supplied to the steam generator 144 reaches the first predetermined position D1, the controller 160 may control the operation of the water supply pump 142 based on the sensor value information transmitted from the water level sensor 145 (305).

When the level of the water supplied to the steam generator 144 does not reach the first predetermined position D1, the controller 160 may control the operation of the water supply pump 142 until the level of the water supplied to the steam generator 144 reaches the first predetermined position D1 (300 and 305).

When the level of the water supplied to the steam generator 144 reaches the first predetermined position D1, the controller 160 may allow the water supply pump 142 to be stopped (305 and 310).

The controller 160 may control the operation of the drain pump 143 to discharge the water present in the steam generator 144 (315).

The controller 160 may control the operation of the drain pump 143 for a first predetermined period of time T1 (320). This control process is to change the water flow into the opposite direction to prevent the water leakage during the water supply process.

The controller 160 may stop the drain pump 143 and terminate the water supply process when the first period of time T1 is expired (325).

Figure 11:
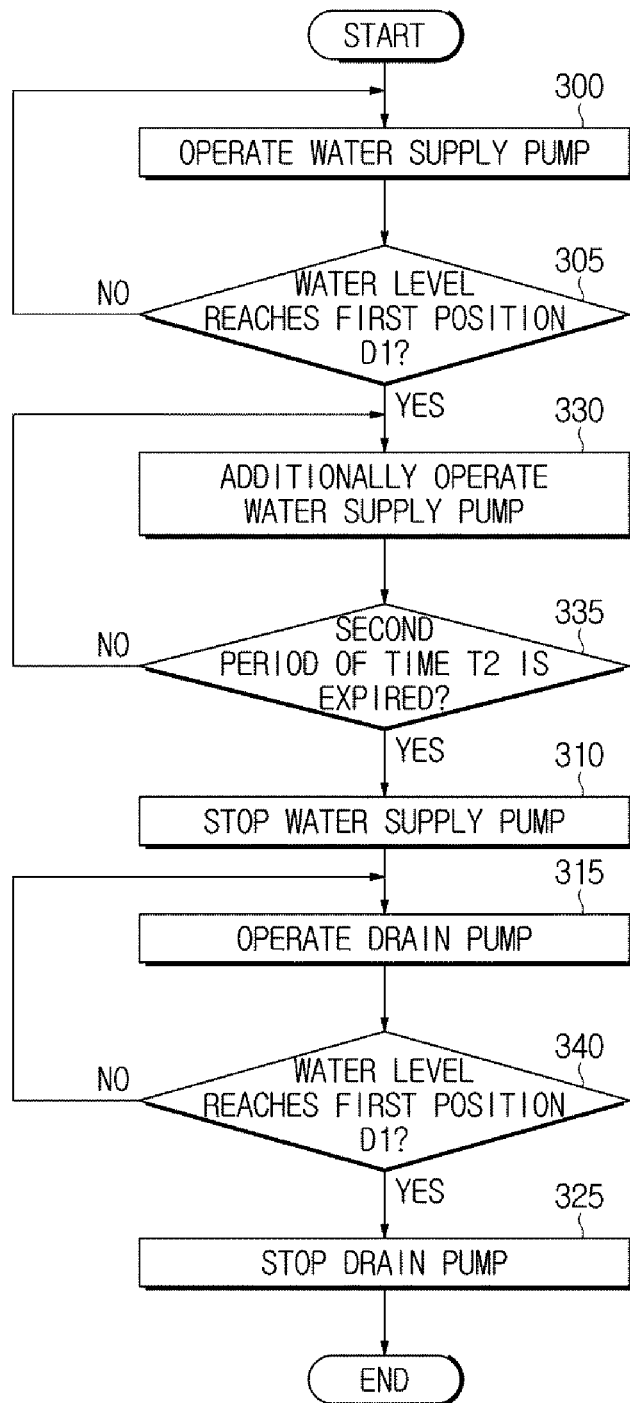
FIG. 11 is a view illustrating a control process of a cooking apparatus according to another embodiment.
Figure 12:
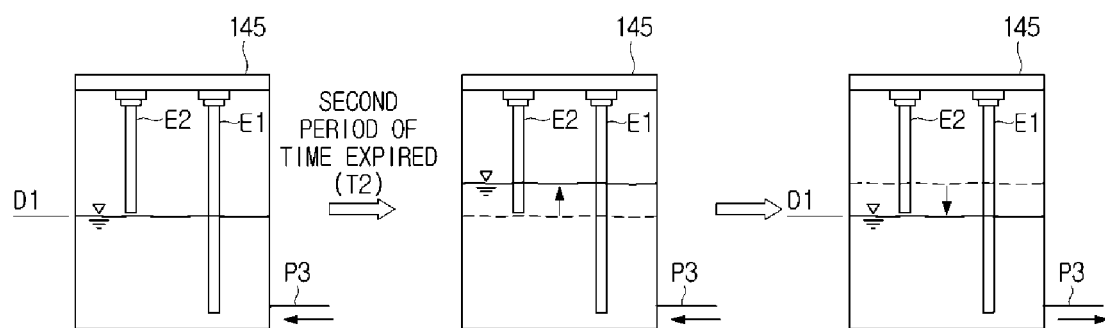
FIG. 12 is a view illustrating a change in the level of water supplied to a water level sensor according to the control process shown in FIG. 11

FIG. 11 is a view illustrating a control process of a cooking apparatus 100 according to another embodiment, and FIG. 12 is a view illustrating a change in the level of water supplied to a water level sensor 145 according to the control process shown in FIG. 11. Since the water supplied to a steam container 144a of a steam generator 144 is supplied to the water level sensor 145 at the same level, a view illustrating a change in the level of the water supplied to the steam container 144a is omitted in FIG. 12.

Referring to FIGS. 11 and 12, a water supply process according to another embodiment is started by a process of controlling the operation of the water supply pump 142.

The controller 160 may control the operation of the water supply pump 142 to supply water from the storage container 141 to the steam generator 144. The water is supplied from the storage container 141 to the steam generator 144 as the water supply pump 142 operates (300).

Until the level of the water supplied to the steam generator 144 reaches the first predetermined position D1, the controller 160 may control the operation of the water supply pump 142 based on the sensor value information transmitted from the water level sensor 145 (305).

When the level of the water supplied to the steam generator 144 reaches the first predetermined position D1, the controller 160 may control the water supply pump 142 to additionally supply water to the steam generator 144 (330).

The controller 160 may control the operation of the water supply pump 142 for a second predetermined period of time T2 (335).

When the second period of time T2 is expired, the controller 160 may stop the operation of the water supply pump 142 and control the operation of the drain pump 143 to discharge the water in the steam generator 144 (335 and 310).

The controller 160 may control the operation of the drain pump 143 so that the level of water in the steam generator 144 reaches the first position D1 again (315 and 340). This control process is to change the water flow into the opposite direction to prevent the water leakage during the water supply process.

The controller 160 may stop the drain pump 143 and terminate the water supply process when the level of water in the steam generator 144 reaches the first position D1 (340 and 325).

Figure 13:
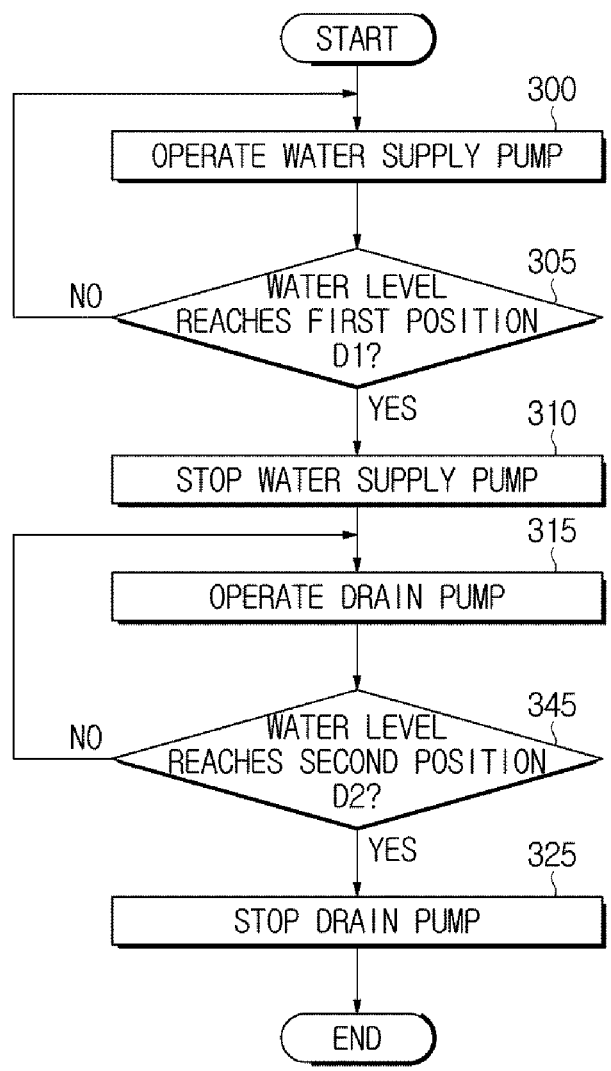
FIG. 13 is a view illustrating a control process of a cooking apparatus according to another embodiment.
Figure 14:
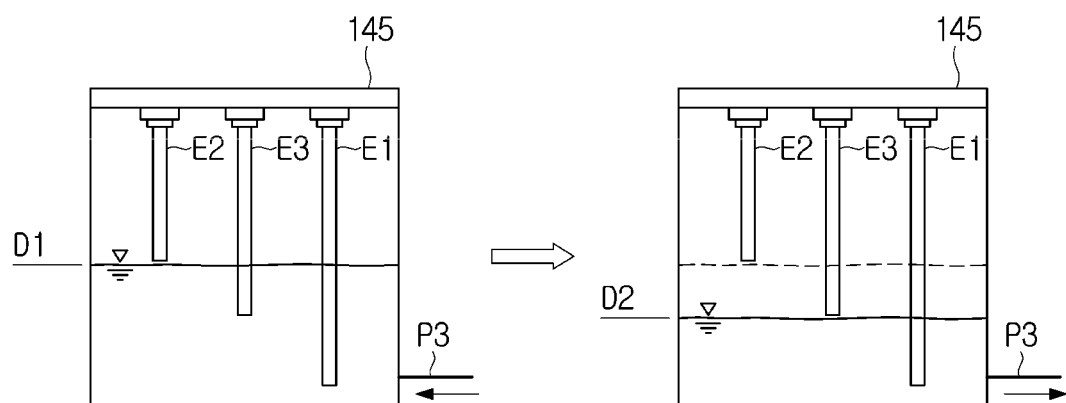
FIG. 14 is a view illustrating a change in the level of water supplied to a water level sensor according to the control process shown in FIG. 13.

FIG. 13 is a view illustrating a control process of a cooking apparatus 100 according to another embodiment, and FIG. 14 is a view illustrating a change in the level of water supplied to a water level sensor 145 according to the control process shown in FIG. 13. Since the water supplied to a steam container 144a of a steam generator 144 is supplied to the water level sensor 145 at the same level, a view illustrating a change in the level of the water supplied to the steam container 144a is omitted in FIG. 14.

A control process as illustrated in FIGS. 13 and 14 is performed by controlling an operation of the water supply pump 142 and the drain pump 143 based on the sensor value information of the water level sensor 145. In other words, in this embodiment, it may be possible to control the operation of the water supply pump 142 and the drain pump 143 based on the sensor value information of the water level sensor 145 in which a third electrode E3 is additionally provided as well as the first and second electrodes E1 and E2. The second electrode E2 is the shortest electrode. The third electrode E3 is longer than the second electrode E2 and shorter than the first electrode E1. The first electrode E1 is the longest ground electrode and thus always immersed in water.

Referring to FIGS. 13 and 14, a water supply process according to another embodiment is started by a process of controlling the operation of the water supply pump 142.

The controller 160 may control the operation of the water supply pump 142 to supply water from the storage container 141 to the steam generator 144 (300). As the water supply pump 142 operates, the water is supplied from the storage container 141 to the steam generator 144 through a first and second connection pipe P1 and P2.

Until the level of the water supplied to the steam generator 144 reaches the first predetermined position D1, the controller 160 may control the operation of the water supply pump 142 based on the sensor value information transmitted from the water level sensor 145 (305).

Particularly, until the level of the water supplied to the steam generator 144 reaches the first predetermined position D1, the controller 160 may control the operation of the water supply pump 142 based on the sensor value information transmitted from the second electrode E2 of the water level sensor 145.

The level of the water present in the water level sensor 145 gradually increases as the water is supplied to the steam generator 144. Therefore, when the level of the water reaches the first position D1, a sensor value of the second electrode E2 may be changed from $v_2$ V to 0 V.

The controller 160 may identify a point of time, in which the sensor value of the second electrode E2 is changed from $v_2$ V to 0 V, as a point of time in which the level of water present in the steam generator 144 reaches the first position D1.

When the level of the water supplied to the steam generator 144 reaches the first predetermined position D1, the controller 160 may stop the operation of the water supply pump 142 and control the drain pump 143 (305 and 310).

The level of water present in the steam container 144a of the steam generator 144 decreases as the drain pump 143 operates, and thus the water level of the water level sensor 145 gradually decreases (315).

Until the level of the water supplied to the steam generator 144 reaches the second predetermined position D2, the controller 160 may control the operation of the drain pump 143 based on the sensor value information transmitted from the third electrode E3 of the water level sensor 145.

When the level of the water present in the water level sensor 145 gradually decreases and the level of the water reaches the second position D2, a sensor value of the third electrode E3 may be changed from 0 V to $v_3$ V. The controller 160 may identify a point of time, in which the sensor value of the third electrode E3 is changed from 0 V to $v_3$ V, as a point of time in which the level of water present in the steam generator 144 reaches the second position D2. This control process is to change the water flow into the opposite direction to prevent water leakage during the water supply process.

The controller 160 may stop the drain pump 143 and terminate the water supply process, when the level of water in the steam generator 144 reaches the predetermined second position D2 (345 and 325).

Next, the control method of the cooking apparatus 100, to which the control process for increasing the steam amount in the operation of the cooking apparatus 100, is applied will be described.

Figure 15:
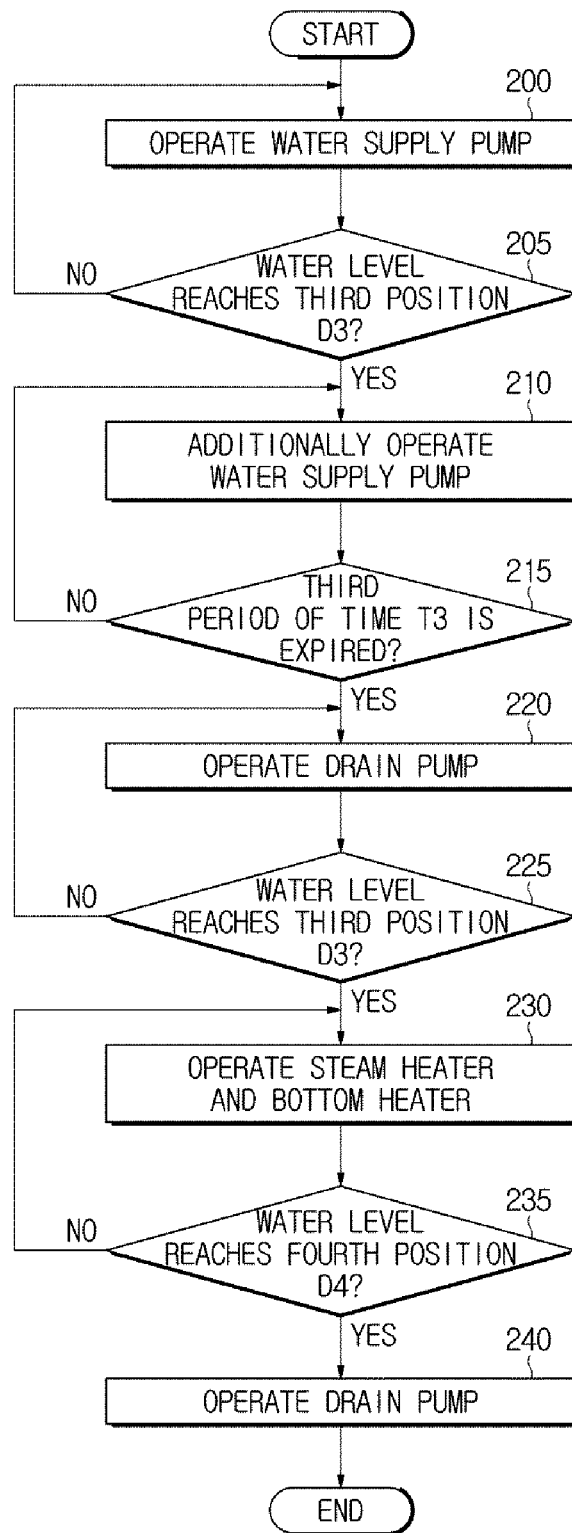
FIG. 15 is a view illustrating a control process of the cooking apparatus according to an embodiment.
Figure 16:
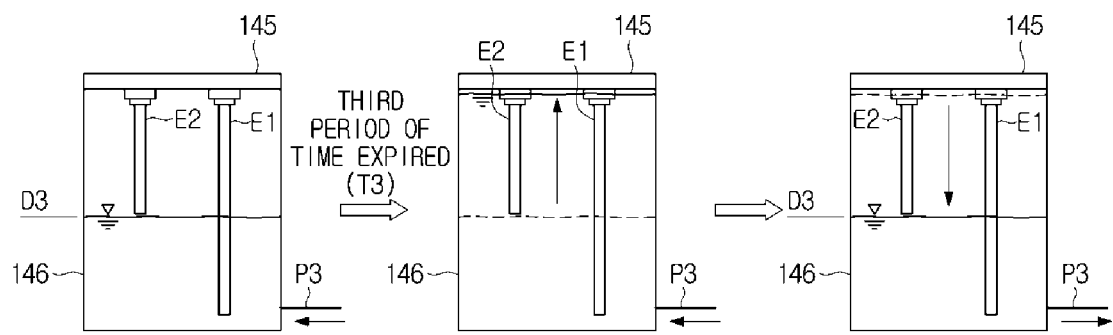
FIG. 16 is a view illustrating a change in the level of water supplied to the water level sensor according to the control process shown in FIG. 15.

FIG. 15 is a view illustrating a control process of the cooking apparatus 100 according to an embodiment, and FIG. 16 is a view illustrating a change in the level of water supplied to the water level sensor 145 according to the control process shown in FIG. 15. Since the water supplied to a steam container 144a of a steam generator 144 is supplied to the water level sensor 145 at the same level, a view illustrating a change in the level of the water supplied to the steam container 144a is omitted in FIG. 15.

When the user inputs an operation command related to the second cooking mode, a series of control processes shown in FIG. 15 is performed.

The controller 160 may control the operation of the water supply pump 142 to supply water to the steam generator 144 when an operation command for the second cooking mode is input from the user (200).

Until the level of the water supplied to the steam generator 144 reaches the third predetermined position D3, the controller 160 may control the operation of the water supply pump 142 based on the sensor value information transmitted from the water level sensor 145 (205). The controller 160 may identify whether the level of the water supplied to the steam generator 144 reaches the third position D3 based on the sensor value information transmitted from the second electrode E2 of the water level sensor 145. Hereinafter redundant description will be omitted.

When the level of the water supplied to the steam generator 144 reaches the third predetermined position D3, the controller 160 may control the operation of the water supply pump 142 for the third predetermined period of time T3, so as to additionally supply water to the steam generator 144 (205, 210 and 215).

This operation is for supplying water into the cooking compartment 102 through the steam supply pipe P4 connecting the steam generator 144 to the inside of the cooking compartment 102. The third period of time T3 is set as an appropriate period of time to allow the water supplied to the steam generator 144 to be supplied to the inside of the cooking compartment 102 through the steam supply pipe P4.

Water exceeding the capacity of the steam container 144a is supplied so that the water supplied to the steam generator 144 is supplied to the inside of the cooking compartment 102. Therefore, the water supplied to the water level sensor 145 may fill up the inside of the sensor housing 146 of the water level sensor 145 as illustrated in FIG. 16.

The water supplied into the cooking compartment 102 is collected on the bottom surface 105 of the cooking compartment 102 and when the bottom heater 120 installed on the bottom surface 105 of the cooking compartment 102 operates, steam generated in the bottom surface 105 of the cooking compartment 102 may be provided to the cooking process. Therefore, it may be possible to increase the steam generation amount in the cooking mode.

The controller 160 may control the operation of the drain pump 143 to discharge the water from the steam generator 144 when the third period of time T3 is expired. When the drain pump 143 operates, the water is discharged from the steam generator 144, and the level of the water supplied to the water level sensor 145 gradually decreases (215 and 220).

The controller 160 may control the operation of the drain pump 143 until the level of water in the steam generator 144 reaches the third position D3.

When the water is discharged from the steam generator 144 and the level of water in the steam generator 144 reaches the third position D3, the controller 160 may simultaneously control the operation of the steam heater 144b installed on the steam generator 144 and the operation of the bottom heater 120 installed on the bottom surface 105 of the cooking compartment 102 (225 and 230). The controller 160 may control the operation of the steam heater 144b and the operation of the bottom heater 120 for a fourth predetermined period of time T4. An operation control time of the steam heater 144b and the bottom heater 120 may be the same or different from each other and hereinafter redundant description will be omitted.

The controller 160 may control the operation of the drain pump 143 to discharge the water from the steam generator 144 when the fourth period of time T4 is expired. When the discharging operation is completed, the controller 160 may terminate the cooking mode (235 and 240)

As is apparent from the above description, the control method of the cooking apparatus secures the steam cooking performance by increasing the amount of steam without increasing output of the steam generator.

In addition, it is possible to prevent a case in which water is supplied to the steam generator when the pump motor of the water supply pump fails that is the water leakage.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of controlling a cooking apparatus, the method comprising:
    controlling an operation of a water supply pump to supply water to a steam generator;
    detecting a level of the water supplied to a steam generator;
    controlling, based on the level of the water supplied to the steam generator increasing and reaching a preset position, an operation of the water supply pump to supply additional water to the steam generator such that the water is supplied to a bottom surface of a cooking compartment for a predetermined period of time; and
    controlling, based on the predetermined period of time expiring, an operation of a drain pump to discharge a portion of the water inside the steam generator.

2. The method of claim 1, further comprising:
    controlling an operation of a steam heater installed on the steam generator and an operation of a bottom heater installed on a bottom surface of the cooking apparatus.

3. The method of claim 1, wherein the controlling of the drain pump includes stopping, based on the level of the water supplied to the steam generator returning to the preset position, the operation of the drain pump.

4. The method of claim 1, wherein the detecting of the level of water supplied to the steam generator includes detecting a flow of an electric current through a floatless switch to detect the level of the water in the steam generator.

5. The cooking apparatus of claim 1, further comprising a steam heater installed on the steam generator and a bottom heater installed on a bottom surface of the cooking apparatus,
    wherein the controller controls the steam heater and the bottom heater.

6. A cooking apparatus comprising:
    a storage container configured to store water;
    a steam generator installed below the storage container and configured to be supplied with the water from the storage container;
    a water level sensor configured to detect a level of the water supplied to the steam generator;
    a water supply pump installed above the storage container and configured to supply water from the storage container to the steam generator;
    a drain pump installed above the storage container and configured to discharge the water from the steam generator to the storage container; and
    a controller configured to:
        control the water supply pump to supply water to the steam generator,
        receive a level, detected by the water level sensor, of the water supplied to the steam generator,
        based on the level of the water supplied to the steam generator increasing and reaching a preset position, control the water supply pump to supply additional water to the steam generator such that the water is supplied to a bottom surface of a cooking compartment for a predetermined period of time, and
        based on the predetermined period of time expiring, control the drain pump to discharge a portion of the water inside the steam generator.

7. The cooking apparatus of claim 6, wherein the controller is configured to, based on the level of the water of the steam generator returning to the preset position, stop operation of the drain pump.

8. The cooking apparatus of claim 6, wherein, to detect the level of the water supplied to the steam generator, a flow of an electric current is detected through a floatless switch to detect the level of the water in the steam generator.

* * * * *